(12) United States Patent
Liu et al.

(10) Patent No.: US 8,719,546 B2
(45) Date of Patent: May 6, 2014

(54) SUBSTITUTE VIRTUALIZED-MEMORY PAGE TABLES

(71) Applicant: Intel Corporation, Santa Clara, CA (US)

(72) Inventors: Baohong Liu, Cupertino, CA (US); Manohar R. Castelino, Sunnyvale, CA (US); Kuo-Lang Tseng, Cupertino, CA (US); Ritu Sood, Milpitas, CA (US); Madhukar Tallam, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/734,851

(22) Filed: Jan. 4, 2013

(65) Prior Publication Data

US 2013/0191611 A1 Jul. 25, 2013

(30) Foreign Application Priority Data

Jan. 4, 2012 (WO) ................ PCT/US2012/020229

(51) Int. Cl.
*G06F 12/14* (2006.01)
(52) U.S. Cl.
USPC .............................. 711/206; 711/221; 726/27
(58) Field of Classification Search
None
See application file for complete search history.

(56) References Cited

U.S. PATENT DOCUMENTS

| | | | |
|---|---|---|---|
| 7,721,064 B1 | 5/2010 | Lam et al. | |
| 7,814,287 B2 | 10/2010 | Pratt | |
| 2008/0235534 A1 | 9/2008 | Schunter et al. | |
| 2009/0049229 A1 | 2/2009 | Honda et al. | |
| 2009/0172353 A1 | 7/2009 | Su et al. | |
| 2009/0222816 A1* | 9/2009 | Mansell et al. | 718/1 |
| 2010/0049960 A1 | 2/2010 | Okamoto et al. | |
| 2010/0333090 A1 | 12/2010 | Wright et al. | |
| 2011/0087822 A1* | 4/2011 | Bennett et al. | 711/6 |
| 2011/0161619 A1 | 6/2011 | Kaminski et al. | |
| 2012/0151184 A1 | 6/2012 | Wilkerson et al. | |
| 2013/0191577 A1 | 7/2013 | Thomas et al. | |

FOREIGN PATENT DOCUMENTS

WO  WO0068779 A2  11/2000

OTHER PUBLICATIONS

International Search Report and Written Opinion mailed Sep. 27, 2012 for PCT Application No. PCT/US2012/020231, 11 pages.
International Search Report and Written Opinion mailed Sep. 28, 2012 for PCT Application No. PCT/US2012/020229, 9 pages.
Office Action mailed Aug. 2, 2013 for U.S. Appl. No. 13/734,834, 47 pages.

* cited by examiner

*Primary Examiner* — Gary Portka
(74) *Attorney, Agent, or Firm* — Schwabe, Williamson & Wyatt, P.C.

(57) ABSTRACT

Embodiments of techniques and systems for using substitute virtualized-memory page tables are described. In embodiments, a virtual machine monitor (VMM) may determine that a virtualized memory access to be performed by an instruction executing on a guest software virtual machine is not allowed in accordance with a current virtualized-memory page table (VMPT). The VMM may select a substitute VMPT that permits the virtualized memory access, In scenarios where a data access length for the instruction is known, the substitute VMPT may include full execute, read, and write permissions for the entire guest software address space. In scenarios where a data access length for the instruction is not known, the substitute VMPT may include less than full execute, read, and write permissions for the entire guest software address space, and may be modified to allow the requested virtualized memory access. Other embodiments may be described and claimed.

17 Claims, 5 Drawing Sheets

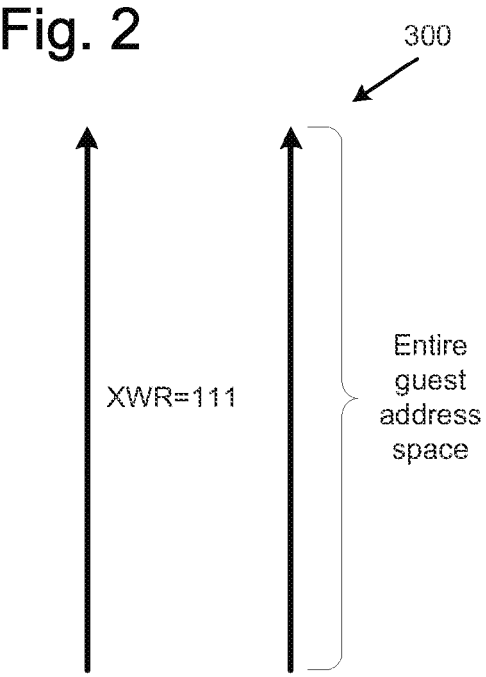
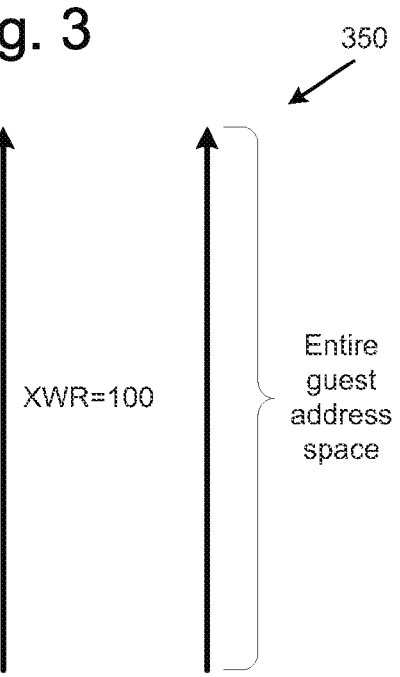

SUBSTITUTE VIRTUALIZED-MEMORY PAGE TABLES

RELATED APPLICATIONS

The present application claims priority under 35 U.S.C. §§119 and 365(a) to International Application No. PCT/US2012/020229, filed Jan. 4, 2012, entitled "SUBSTITUTE VIRTUALIZED-MEMORY PAGE TABLES", which designated the United States of America and at least one country other than the United States. The entire contents of International Application No. PCT/US2012/020229 is hereby incorporated by reference in its entirety.

TECHNICAL FIELD

This application relates to the technical field of data processing, and more specifically to use of substitute virtualized-memory page tables.

BACKGROUND

Many computer systems utilize virtualized memory for security, stability and/or other purposes. In various virtualized-memory systems, a virtual machine monitor ("VMM") may control direct use of memory and/or computer processors in a computer system. The virtual machine monitor, which may be implemented in software and/or hardware, may allow guest software to run only in virtual machines, each containing their own guest address space defined by virtualized memory addresses.

In various systems, these virtualized memory addresses are mapped to physical memory addresses through the use of page tables controlled by the virtual machine monitor. In some systems, these page tables may specify access permissions for memory pages (hereinafter, may simply referred to as "page"). Thus, a page table may define, for each page of virtualized memory presented to a piece of guest software, whether the guest software may 1) execute instructions from that locations in that page, 2) read from locations in that page, and/or 3) write to locations in that page. In various systems, multiple page tables may be used, or switched to during execution, in order to allow particular accesses, as determined by the VMM.

As an example, pages W and X may hold trusted data, while pages Y and Z may hold trusted code sections. To enable code in pages Y and Z to access data in pages W and X, but prevent code in other pages from accessing data in pages W and X, a page table may provide execute permission for pages Y and Z, and read/write permission for pages W and X.

However, in some scenarios, current page table utilization may introduce problems. For example, in a scenario where code in page Y of the above example were supposed to be allowed to access both pages W and X but code in page Z were only allowed to access page W, then the above described page table would be insufficient to provide proper security, and other page tables would be required. Thus, in some systems, many different page tables must be maintained in order to provide different sets of access permissions for different guest software, increasing resource usage and complexity.

Secondly, in some scenarios, no page table may be sufficient to properly control memory location access permissions, as permissions need to be given at a granularity lower than that of a page. For example, a page Q may hold both trusted data D1 and untrusted data D2. To enable untrusted code to access untrusted data D2, a page table would have to have read/write permission for page Q and execute permission for untrusted code at the same time. This would allow untrusted code to access data D2 so that it can access trusted data D1.

Some systems address these issues by keeping a smaller number of page tables and by modifying them on a per-access basis before use. Thus, for example, if access to an address is needed that is not permitted by a currently-used page table, the VMM (after determination that the access is proper) may modify the current page table to temporarily provide the requested read/write permission. Control may then be transferred back to the guest software for data access execution. After execution of the data access, the control may be transferred back to VMM to restore the original permission.

This process may introduce its own inefficiencies, however. In some systems, more than one computer processor may utilize a given page table. Thus, when a page table needs to be modified temporarily for a data access by one processor, any other processor using the modified page table must be paused or otherwise made to wait so that it does not run using the modified permissions. This processor pausing may slow down performance. Additionally, the page table modification time itself incurs a performance penalty and can be a system stability issue.

BRIEF DESCRIPTION OF THE DRAWINGS

Embodiments of the present invention will be described by way of exemplary embodiments, but not limitations, illustrated in the accompanying drawings in which like references denote similar elements, and in which:

FIGS. 2 and 3 are block diagrams illustrating example substitute virtualized-memory page tables, in accordance with various embodiments;

DETAILED DESCRIPTION OF ILLUSTRATIVE EMBODIMENTS

Figure 1:
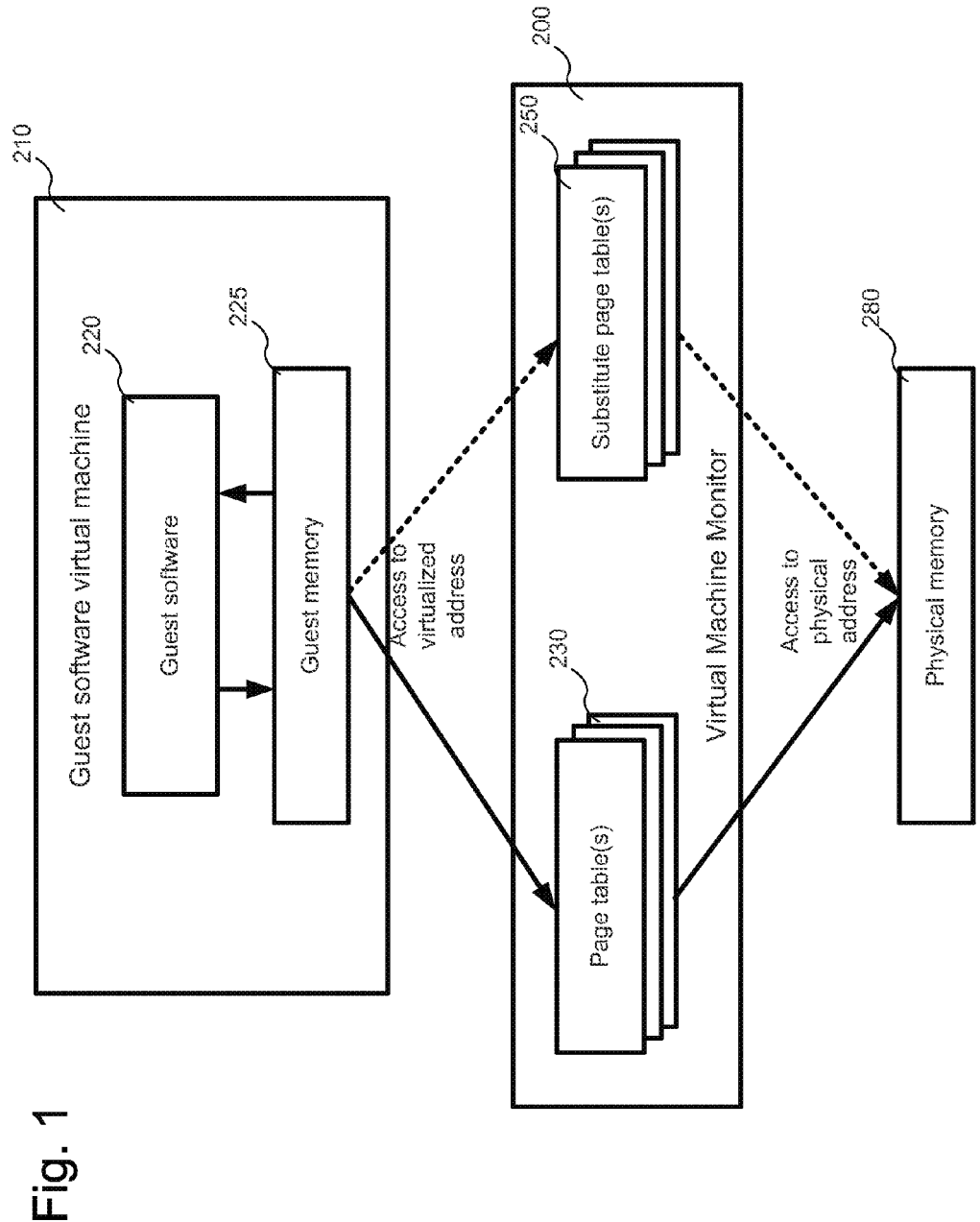
FIG. 1 is a block diagram illustrating a virtual machine monitor providing substitute page tables, in accordance with various embodiments.

Methods, apparatuses, and storage media associated with substitutive virtualized-memory page tables are disclosed herein.

In various embodiments, one or more computer-readable storage media may comprise first instructions that, in response to execution by a computing device, cause the computing device to perform one or more operations, The instructions may cause the computing device to determine that a second instruction to be executed on a computer processor of the computing device attempts to perform an access to a virtualized memory address location, the access to the virtualized memory address location being not permitted in accordance with a current virtualized-memory page table, The instructions may also cause the computing device to execute the second instruction on the computer processor in accordance with a substitute virtualized-memory page table, the substitute virtualized-memory page table configured to permit the access to the virtualized memory address location.

In other embodiments, apparatuses and/or computer-implemented methods may perform one or more of the operations discussed above and described herein.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

Referring to FIG. 1, a block diagram is shown illustrating a virtual machine monitor 200 which may, in various embodiments, provide one or more substitute virtualized-memory page tables 250 ("SPTs") for use to provide temporary access permissions to a guest software virtual machine 210. In various embodiments, the virtual machine monitor 200 and guest software virtual machine 210 may be operated on a computing device, such as a laptop, desktop, server, and/or mobile device. In various embodiments, the SPTs 250 may be provided by the virtual machine monitor 200 to the guest software virtual machine 210 instead of one or more other virtualized-memory page tables 230 ("PTs").

In various embodiments, the guest software virtual machine 210 may include guest memory 225. In various embodiments, the guest memory 225 may include an abstraction of actual physical memory (such as, for example, physical memory 280), that is translated to the physical memory 280 using the virtual machine monitor 200, along with its PTs 230. Thus, as the guest software 220 attempts to access memory location corresponding to a virtual address in the guest memory 225, the guest memory 225 will, in turn refer to the PTs 230 to translate the virtual access to a corresponding physical memory address. In various embodiments, results of the access may be returned after such an access, such as, for example, read results or write acknowledgments. In other embodiments, access error messages may be returned, such as when a memory access is not permitted. These are not illustrated for the purposes of simplified illustration. In various embodiments, that virtual machine monitor providing the PTs 230 and substitute virtualized-memory page tables 250 may be implemented, in whole or in part in hardware. In some embodiments, the guest memory 225 may also comprise guest virtualized memory (not illustrated), with guest virtualized memory addresses being translated into addresses in guest memory 225 by one or more guest virtualized machine page tables (not illustrated). In various embodiments, substitute page tables 250 may be used by the virtual machine monitor regardless of usage or implementation of guest virtualized memory page tables.

In various embodiments, the SPTs 250 may be provided on a temporary basis (indicated by the dotted lines) in order to provide for a temporary change in memory access permissions for memory accesses performed by the guest software virtual machine 210. Thus, in various embodiments, as a memory access is attempted by the guest software virtual machine, that access may not be permitted by a currently-used virtualized-memory page table. However, the virtual machine monitor 200 may determine that the access should be allowed. In various embodiments, rather than modifying the current virtualized-memory page table, as described above, the virtual machine monitor 200 may provide an SPT 250 for use by the guest software virtual machine 210 in place of the current PT.

In various embodiments, the SPT may be configured to allow for the access that was not permitted by the current PT. In various embodiments, the SPT may be so configured by being configured, before the requested access, to provide permission for the requested access.

FIG. 2 shows an example of an SPT, in accordance with various embodiments. As illustrated in FIG. 2, an SPT may be configured, in various embodiments, to permit all types of access for every virtualized memory address in the entire guest software virtual machine address space. (This is illustrated in the example of FIG. 2 as "XWR=111", meaning execute, write, and read access are each respectively permitted.) Thus, in some embodiments, if the virtual machine monitor 200 determines that a guest software virtual machine 210 should be permitted to access a given virtualized memory address that is not allowed by a currently-used PT, the VMM may use the example SPT instead to quickly provide for access to the virtualized memory Address. In various embodiments, because the SPT allows access permissions for the entire guest address space, there may be no need for any further modifications or determinations. The VMM may switch to use of the SPT, allow the memory access, and switch back to the previously-used PT after the access has been performed.

In various embodiments, because the SPT 300 is pre-configured (before access) to allow access to every virtualized memory address location in the guest address space, the SPT 300 may not need to be modified for use by any one computer processor. Thus, in various embodiments, multiple computer processors may utilize the SPT 300 at different points in their respective execution without concern that one computer processor may have to wait on execution to allow for modification by the VMM on behalf of another computer processor.

In various embodiments, however, the SPT 300, which includes full permissions for every virtualized memory address location, may not always be desirable for selection by the VMM 200. In some embodiments, the desirability of using an SPT with full permissions may be determined, at least in part, on the ability of the VMM to determine a length of data access (such as a total number of data bytes) to be performed by an instruction. Thus, when the VMM can determine a length of data access of an instruction, the VMM can determine, for the entire length of data being accessed by the instruction, whether the access should be allowed. If the VMM determines that access is permissible for this entire length, then the VMM may safely use an SPT such as substitute virtualized-memory page table 300 that has full permissions.

However, if such a data length cannot be determined by the VMM, the VMM may not be able to confirm that the requested access be allowed. In such a scenario, in various embodiments the VMM may select an SPT that has less than full permissions for the virtualized memory address for which access has been requested. For example, the VMM may select SPT 350 of FIG. 3 (XWR=100), which has only execute permission for the entire guest virtual machine address space, but does not have read or write permission. In other embodiments, the VMM may select an SPT that has execute and read, but not write, permission for the guest virtual machine address space. For example, such an SPT may be selected when the VMM is protecting memory from writes by untrusted code, but not necessarily from reads. In various embodiments, the VMM may then modify the selected SPT to allow a particular access for the requested virtualized memory address and/or for the page that the virtualized memory address fails into.

In some embodiments, this modification may require additional time and/or resources, and thus may not provide the same efficiency as use of the SPT 300. However, efficiencies over other systems may still be realized as using and modifying the SPT can still be performed without pausing computer processors that are using PTs. In some embodiments, if more than one computer processor is using an SPT that is being modified, these computer processors may be made to wait on execution until the modification is complete. However, if SPTs are provided by the VMM that are unique to (or otherwise associated with) each computer processor, this may obviate the need to cause computer processors to wait during modification. Particular examples of selecting and modifying SPTs are described below. It may also be noted that, while the example SPTs 300 and 350 are each configured with the same permissions for the entire guest software virtual machine address space, in some embodiments, the SPTs may be configured to have the same permissions for less than the entire guest software virtual machine address space.

Figure 4:
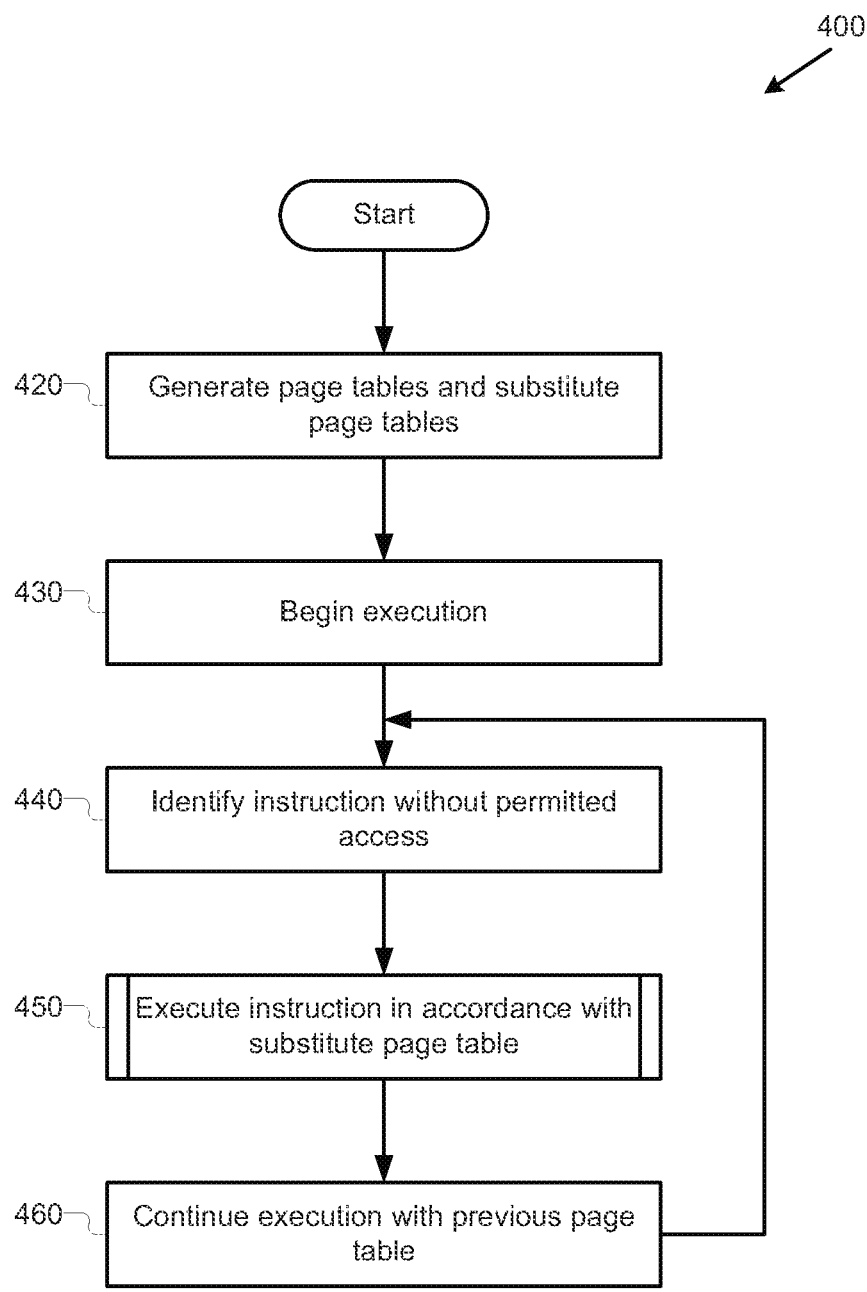
FIG. 4 illustrates an example substitute virtualized-memory page table utilization process, in accordance with various embodiments.

FIG. 4 illustrates an example substitute virtualized-memory page table utilization process 400 in accordance with various embodiments. In various embodiments, the process may be performed by the VMM 200 and guest software virtual machine 210. The process may begin at operation 420. At operation 420, VMM 200 may generate one or more PT and SPTs. In various embodiments, operation 420 may include generating SPTs that have full permissions for an entire guest software virtual machine address space, such as, for example, SPT 300. In various embodiments, operation 420 may include generating SPTs that have fewer than full permissions for one or more parts of an entire guest software virtual machine address space, such as, for example, SPT 350. In various embodiments, operation 420 may include generating SPTs that that are associated with particular computer processors; in some embodiments, operation 420 may generate multiple similar SPTs such that there is one associated with each computer processor.

Next, at operation 430, the guest software virtual machine 210 may begin execution of guest software 220. This execution may include the guest software virtual machine 210 operating under control of the VMM 200 and utilizing one or more PTs 230. At operation 440, the VMM may identity that an instruction to be executed by the guest software virtual machine 210 will attempt a memory access that is not permitted by a currently-used PT 230. Next, at operation 450, the VMM 200 and guest software virtual machine 210 may execute the instruction in accordance with an SPT 250. Particular embodiments of this operation are described below. In various embodiments, the instruction may be executed under a flag or other hardware- or software-enabled construct that allows only the single instruction itself to be executed before control is returned to the previously-used PT. This may help confirm that only the identified instruction is executed in accordance with the increased permissions of the STP.

After conclusion of operation 450, at operation 460, the guest software virtual machine 210 may continue execution of guest software 220 using the previously-used PT 230. The process may then proceed back to operation 440 if another instruction is identified which is not permitted by the currently-used PT 230. After the guest software virtual machine 210 has completed execution of guest software 210, the process may end (not illustrated).

Figure 5:
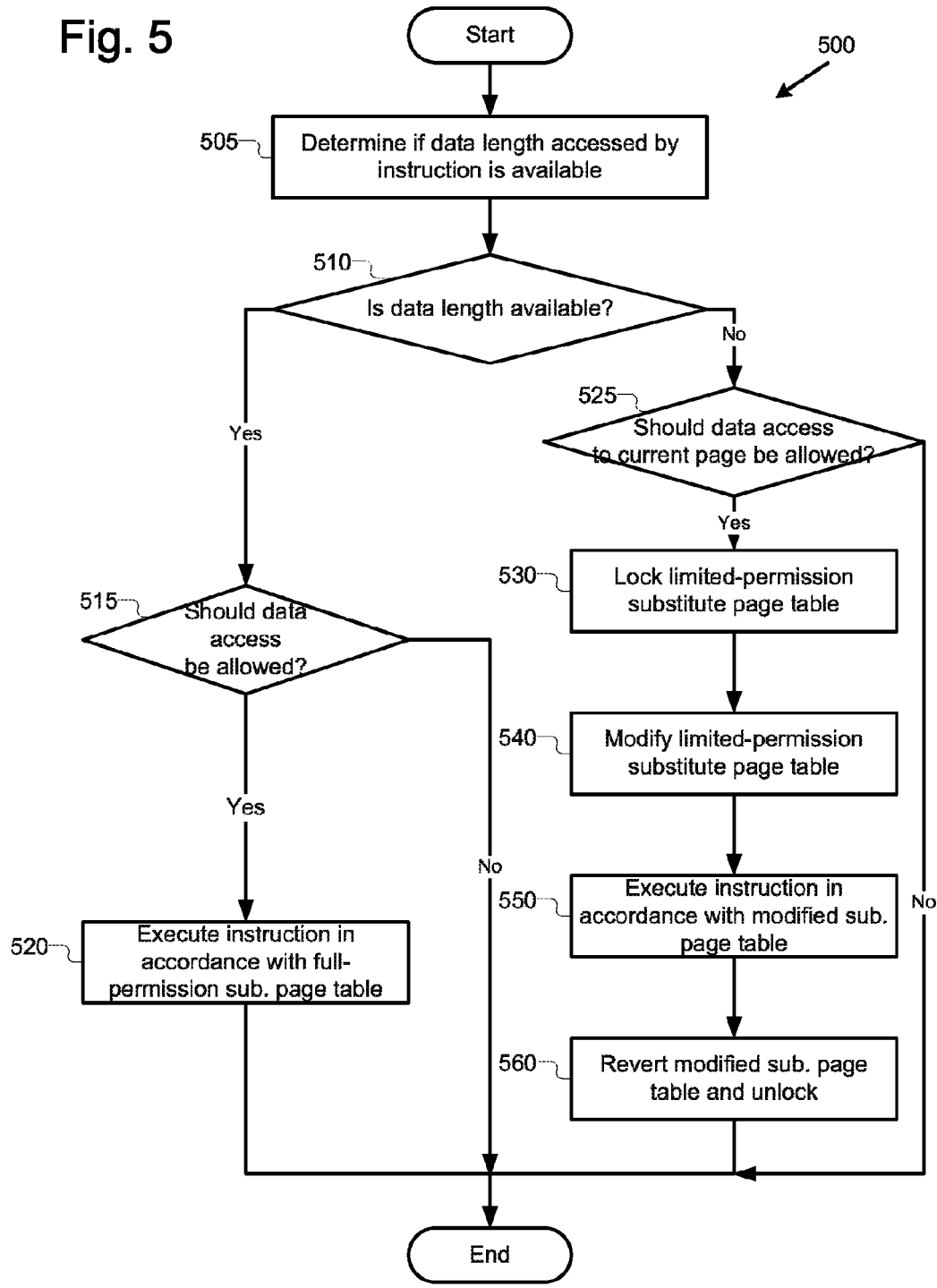
FIG. 5 illustrates an example instruction execution process utilizing substitute virtualized-memory page tables, in accordance with various embodiments.

FIG. 5 illustrates an example an example instruction execution process 500 utilizing SPTs in accordance with various embodiments. In various embodiments, the process may be performed by the VMM 200 and guest software virtual machine 210. In various embodiments, process 500 may describe one or more implementations of operation 450 of process 400. In various embodiments, process 500 may be performed with references to an instruction which attempts a virtualized memory access that is not permitted by the current PT, such as by the result of operation 440 of process 400.

The process may begin at operation 505. At operation 505, the VMM may determine if a data length (such as a total number of data bytes) to be accessed by the instruction is available. Next, at operation 510, the VMM may perform one of two sets of operations based on whether the data length was available at operation 505. If the data length was determined to be available, then at operation 515, the VMM 200 may determine whether the instruction should be allowed to perform its requested access. If the VMM determines that the instruction should not be allowed to perform its requested access, then process may end and an optional error message (not illustrated) may be returned. If the VMM determines, at operation 515, that the access should be permitted, then at operation 520, the VMM may execute the instruction in accordance with an STP that has full permissions, such as example STP 300. In various embodiments, the instruction may be executed under a flag or other hardware- or software-enabled construct that allows only the single instruction itself to be executed before control is returned to the previously-used PT. This helps confirm that only the instruction at hand is executed in accordance with the STP, and that standard PT access permissions are used for subsequent instructions executed by the guest software virtual machine 210. The process may then end.

If however, the VMM has determined that the access data length for the instruction is not available, then the VMM may perform a series of operations to utilize an STP with fewer than all permissions. Thus, at operation 525, the VMM 200 may determine whether the instruction should be allowed to perform its requested access on a current page (e.g., a current page for which it was determine that the instruction was not permitted access). If the VMM determines that the instruction should not be allowed to perform its requested access on that page, then process may end and an optional error message (not illustrated) may be returned. If the VMM determines, at operation 525, that the access should be permitted to the current page, then at operation 530, the VMM may obtain a lock on an STP with a limited set of permissions, such as, for example, STP 350. In various embodiments, the VMM may obtain a lock on the STP in order that it may modify the STP without causing conflict with other processes that may also wish to use and/or modify the STP. In some embodiments, if the STP is particular to the processor executing the instruction, then the lock operation 530 may not be performed.

Next, at operation 540, the VMM may modify the STP to allow the requested access. In various embodiments, this modification may include modifying the STP only for the initial page the instruction seeks to access (since the data length is unknown). Next, at operation 550, the VMM may execute the instruction in accordance with the modified STP. Again, in various embodiments, the instruction may be executed under a flag or other hardware- or software-enabled construct that allows only the single instruction itself to be executed before control is returned to the previously-used PT. Then, at operation 560, the VMM may modify the STP to revert it back to its previous state. The VMM may also unlock the STP at this operation. The process may then end.

Figure 6:
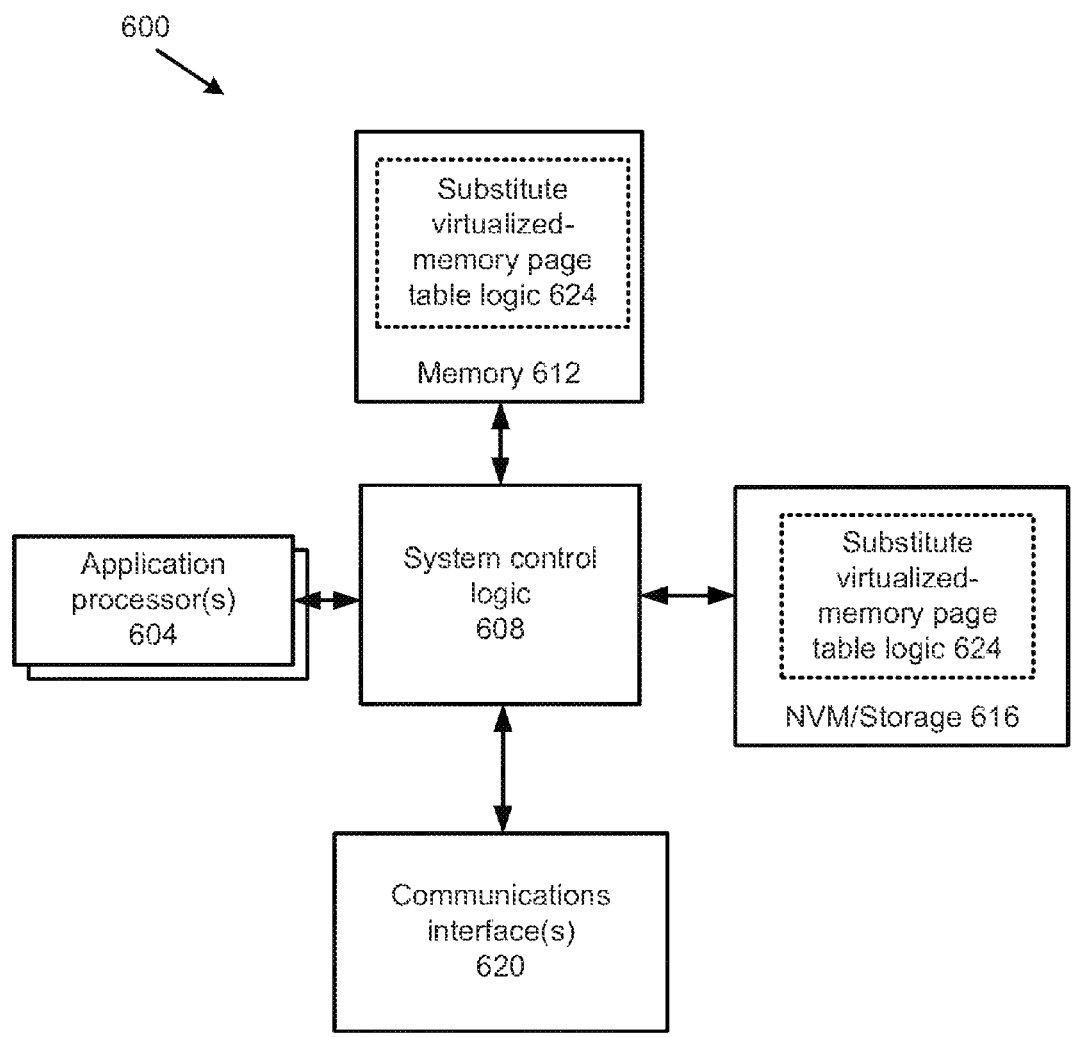
FIG. 6 illustrates an example computing environment, in accordance with various embodiments.

The techniques and apparatuses described herein may be implemented into a system using suitable hardware, firmware, and/or software to configure as desired. FIG. 6 illustrates, for one embodiment, an example system 600 including at least processors 604, each having one or more processor cores, system control logic 608 coupled to at least one of the processors 604, memory 612 coupled to system control logic 608, non-volatile memory ("NVM")/storage 616 coupled to system control logic 608, and one or more communications interface(s) 620 coupled to system control logic 608. In various embodiments, the system 600 may include components of a CPU-based software system, a management engine system, or a combination of the two.

System control logic 608 for one embodiment may include any suitable interface controllers to provide for any suitable interface to at least one of the processors 604 and/or to any suitable device or component in communication with system control logic 608. The processors may include a dedicated application processor upon which an application environment may be operated, as well as a separate service processor upon which a manageability engine may be operated. The system may include additional processors or processing cores (not illustrated).

System control logic 608 for one embodiment may include one or more memory controllers) to provide an interface to memory 612. System memory 612 may be used to load and store data and/or instructions, for example, for system 600. System memory 612 for one embodiment may include any suitable non-transitory computer-readable volatile memory, such as suitable dynamic random access memory (DRAM), for example.

System control logic 608 for one embodiment may include one or more input/output (I/O) controller(s) to provide an interface to NVM/storage 616 and communications interface(s) 620.

NVM/storage 616 may be used to store data and/or instructions, for example. NVM/storage 616 may include any suitable non-transitory computer-readable non-volatile memory, such as flash memory, for example, and/or may include any suitable non-volatile storage device(s), such as one or more hard disk drive(s) (HDD(s)), one or more solid-state drive(s), one or more compact disc (CD) drive(s), and/or one or more digital versatile disc (DVD) drive(s), for example.

The NVM/storage 616 may include a storage resource physically part of a device on which the system 600 is installed or it may be accessible by, but not necessarily a part of, the device. For example, the NVM/storage 616 may be accessed over a network via the communications interfaces) 620.

Memory 612 and NVM/storage 616 may include, in particular, temporal and persistent copies of logic, respectively. In the illustrated example, this logic may include SPT logic 624. The SPT logic 624 may include instructions that, when executed by at least one of the processors 604, may cause system 600 to perform some or ail of the operations associated with processes 400 and 500. In some embodiments, the SPT logic 624 may additionally/alternatively be located in the system control logic 608.

Communications interface(s) 620 may provide an interface for system 600 to communicate over one or more network(s) and/or with any other suitable device. Communications interface(s) 620 may include any suitable hardware and/or firmware. Communications interface(s) 620 for one embodiment may include, for example, a network adapter, a wireless network adapter, a telephone modem, and/or a wireless modem. For wireless communications, communications interface(s) 620 for one embodiment may use one or more antenna(s).

For one embodiment, at least one of the processors) 604 may be packaged together with logic for one or more controllers) of system control logic 608. For one embodiment, at least one of the processors) 604 may be packaged together with logic for one or more controllers of system control logic 608 to form a System in Package (SiP). For one embodiment, at least one of the processors) 604 may be integrated on the same die with logic for one or more controller(s) of system control logic 608. For one embodiment, at least one of the processor(s) 604 may be integrated on the same die with logic for one or more controller(s) of system control logic 608 to form a System on Chip (SoC). For at least one embodiment, the SoC may be utilized in a smart phone, cell phone, tablet, or other mobile device.

In various embodiments, system 600 may have more or less components, and/or different architectures.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

What is claimed is:

1. One or more computer-readable storage media comprising first instructions that, in response to execution by a computing device, cause the computing device to:

determine that a second instruction to be executed on a computer processor of the computing device requests access to a virtualized memory address location, the access to the virtualized memory address location being not permitted in accordance with a current virtualized-memory page table;
determine whether a total number of data bytes to be accessed by the second instruction can be determined prior to execution of the second instruction;
select a substitute virtualized-memory page table based on whether t total number of data bytes can be determined; and
execute the second instruction on the computer processor in accordance with the substitute virtualized-memory page table, the substitute virtualized-memory page table configured to permit the access to the virtualized memory address location.

2. The computer-readable media of claim 1, wherein the first instructions, in response to execution by the computer processor, cause the computing device to execute the second instruction in accordance with a substitute virtualized-memory page table that has full execute, read, and write permissions for the virtualized memory address location when the total number of data bytes can be determined.

3. The computer-readable media of claim 1, wherein the first instructions, in response to execution by the computer processor, cause the computing device to execute the second instruction in accordance with a substitute virtualized-memory page table that has less than full execute, read, and write permissions for the virtualized memory address location when the total number of data bytes cannot be determined.

4. The computer-readable media of claim 3, wherein the first instructions, in response to execution by the computer processor, cause the computing device to modify a substitute virtualized-memory page table that does not permit the access to the virtualized memory address location such that, after modification, the substitute virtualized-memory page table permits the access to the virtualized memory address location.

5. The computer-readable media of claim 4, wherein the first instructions, in response to execution by the computer processor, cause the computing device to modify the substitute virtualized-memory page table that permits the access to the virtualized memory address location after execution of the second instruction such that, after modification, the substitute virtualized-memory page table does not permit the access to the virtualized memory address location.

6. The computer-readable media of claim 4, wherein the first instructions, in response to execution by the computer processor, cause the computing device to wait on execution of one or more computer processors that utilize the substitute virtualized-memory page table during modification of the substitute virtualized-memory page table and execution of the second instruction.

7. The computer-readable media of claim 1, wherein the substitute virtualized-memory page table is specific to the computer processor.

8. The computer-readable media of claim 1, wherein the substitute virtualized-memory page table is configured to permit the access for all memory addresses in a virtualized memory space.

9. An apparatus comprising:
one or more computer processors;
a virtual machine monitor configured to be operated by the one or more computer processors to:
determine that an instruction to be executed on one of the one or more computer processors requests access to a virtualized memory address location, the access to the virtualized memory address location being not permitted in accordance with a first virtualized-memory page table configured to include permissions for accesses performed by instructions executed on the computer processor;
determine whether a total number of data bytes to be accessed by the instruction can be determined prior to execution of the instruction:
select a substitute virtualized-memory page table, out of one or more substitute virtualized-memory page tables, based on whether the total number of data bytes can be determined; and
cause the computer processor to execute the instruction on the computer processor in accordance with the selected substitute virtualized-memory page table, the selected substitute virtualized-memory page table configured to permit the access to the virtualized memory address location.

10. The apparatus of claim 9, wherein the virtual machine monitor is further configured to modify a substitute virtualized-memory page table that does not permit the access to the virtualized memory address location such that, after modification, the substitute virtualized-memory page table permits the access to the virtualized memory address location.

11. The apparatus of claim 10, wherein the virtual machine monitor is further configured to modify the substitute virtualized-memory page table that permits the access to the virtualized memory address location after execution of the instruction such that, after modification, the substitute virtualized-memory page table does not permit the access to the virtualized memory address location.

12. The apparatus of claim 10, wherein the virtual machine monitor is further configured to wait on execution of one or more computer processors that utilize the substitute virtualized-memory page table during modification of the substitute virtualized-memory page table and execution of the instruction.

13. The apparatus of claim 9, wherein the selected substitute virtualized-memory page table is configured to permit the access for all memory addresses in a virtualized memory space.

14. A computer-implemented method, comprising:
determining, by a computing device, that an instruction to be executed on a computer processor of the computing device requests access to a virtualized memory address location, the access to the virtualized memory address location being not permitted in accordance with a current virtualized-memory page table;
determining, by the computing device, whether a total number of data bytes to be accessed by the instruction can be determined prior to execution of the instruction;
selecting a substitute virtualized-memory page table based at least in part on whether the total number of data bytes can be determined; and
execute, by the computing device, the instruction on the computer processor in accordance with the substitute virtualized-memory page table, the substitute virtualized-memory page table configured to permit the access to the virtualized memory address location.

15. The method of claim 14, further comprising modifying a substitute virtualized-memory page table that does not permit the access to the virtualized memory address location such that, after modification, the substitute virtualized-memory page table permits the access to the virtualized memory address location.

16. The method of claim 15, further comprising modifying the substitute virtualized-memory page table that permits the access to the virtualized memory address location after execution of the instruction such that, after modification, the substitute virtualized-memory page table does not permit the access to the virtualized memory address location.

17. The method of claim 14, wherein the selected substitute virtualized-memory page table is configured to permit the access for all memory addresses in a virtualized memory space.

\* \* \* \* \*